United States Patent
Concer et al.

(10) Patent No.: US 9,628,394 B2
(45) Date of Patent: Apr. 18, 2017

(54) NETWORK SWITCH CIRCUIT, SYSTEM AND METHOD

(71) Applicant: NXP B.V., Eindhoven (NL)

(72) Inventors: Nicola Concer, Eindhoven (NL); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 14/683,823

(22) Filed: Apr. 10, 2015

(65) Prior Publication Data
US 2016/0301614 A1    Oct. 13, 2016

(51) Int. Cl.
| | |
|---|---|
| H04J 1/16 | (2006.01) |
| H04L 12/851 | (2013.01) |
| H04L 12/721 | (2013.01) |
| H04L 12/863 | (2013.01) |
| H04L 12/46 | (2006.01) |
| H04L 12/931 | (2013.01) |

(52) U.S. Cl.
CPC ...... *H04L 47/2441* (2013.01); *H04L 12/4641* (2013.01); *H04L 45/66* (2013.01); *H04L 47/6215* (2013.01); *H04L 49/351* (2013.01)

(58) Field of Classification Search
USPC .......... 370/229–252, 401–469; 709/224–249
See application file for complete search history.

(56) References Cited

U.S. PATENT DOCUMENTS

| | | | | |
|---|---|---|---|---|
| 6,160,812 A * | 12/2000 | Bauman | ............ | H04L 12/5693 370/230 |
| 6,246,691 B1 * | 6/2001 | Briem | ............ | H04L 29/06 370/395.43 |
| 7,248,593 B2 * | 7/2007 | Minnick | ............ | H04L 12/5693 370/394 |
| 7,474,676 B2 * | 1/2009 | Tao | ............ | H04L 1/1628 370/469 |
| 7,577,157 B2 * | 8/2009 | Kumar | ............ | H04L 49/9047 370/229 |
| 7,839,892 B2 * | 11/2010 | Eckert | ............ | H04L 12/5693 370/466 |
| 7,948,936 B2 * | 5/2011 | Lohr | ............ | H04L 12/5693 370/230 |
| 8,270,381 B2 * | 9/2012 | Meier | ............ | H04W 28/14 370/230.1 |

(Continued)

OTHER PUBLICATIONS

Extended European Search Report for Patent Appln. No. 16164229.3 (Aug. 11, 2016).

(Continued)

*Primary Examiner* — Man Phan
(74) *Attorney, Agent, or Firm* — Rajeev Madnawat

(57) ABSTRACT

Data packets are received from a plurality of communication nodes within a local Ethernet network, the data packets including a media access control address ("MAC address") are indicative of a destination and a data packet traffic class. Based upon the traffic class of each data packet, each of the received data packets are assigned in to one of the plurality of queues of a memory circuit. Based upon the MAC address of each data packet, the data packets within at least one of the queues are sorted. Each queue is then serviced and the data packets within are transmitted based upon the sorting.

17 Claims, 4 Drawing Sheets

(56) References Cited

U.S. PATENT DOCUMENTS

2003/0058878 A1 3/2003 Minnick et al.
2013/0308648 A1* 11/2013 Shamis ................ H04L 12/465
　　　　　　　　　　　　　　　　　　　　　　　　370/395.53

OTHER PUBLICATIONS

"IEEE 802.1 p-Based QoS", p. 1 (Oct. 2, 2007), retrieved from the Internet Jul. 28, 2016 at: http://documentation.netgear.com/gs7 48t/enu/202-1 0331-01 IGS748T_SW_UM-6-17.html.
"Mapping CoS/802.1p to a Queue", p. 1 (Jan. 2, 2014), retrieved from the Internet Jul. 28, 2016 at: https://www.cisco.com/assets/sol/sb/SG220_Emulators/SG220_Emulator_v1-0-0-18_20140626/help/Quality_Service06.html.
The MEF, "Technical Specification, MEF 10.2 Ethernet Services Attributes Phase 2", 65 pgs. (Oct. 27, 2009).
The IEEE 802.IEEE Standard for Local and metropolitan area networks—Media Access Control (MAC) Bridges and Virtual Bridge Local Area Networks.
Specht, Johannes, "Urgency Based Scheduler—Performance and Characteristics" 2013.
Specht, Johannes; Jochim, Markus, "Urgency Based Scheduler—Considerations for Low Latency Reserved Streams" 2013.

* cited by examiner

NETWORK SWITCH CIRCUIT, SYSTEM AND METHOD

A variety of network-based communications including network switches are used in different systems and environments. For example, industrial, automotive and other industries have used network switches to facilitate the control of devices and/or communication between nodes. These communications have been increasingly used, to suit various needs. In particular, the automotive industry has seen increased use of network switches for a variety of uses, such as for controlling the communication between nodes relating to the operation of a vehicle and its sub-systems.

One type of communication network that is being increasingly used in vehicles is Ethernet-based. An Ethernet-based communication system within a vehicle includes a number of communication nodes which communicate data packets between one another via network switches which control the flow of the data packets between the source and destination communication nodes. Such an Ethernet-based communication network can be implemented with a hierarchical arrangement to ensure the priority delivery of control-data traffic to vital systems of the vehicle (e.g., brakes, air-bags, etc.). Similarly, low-priority traffic on the Ethernet-based communication network can be communicated in accordance with a best-effort protocol (e.g., only transmitting such low-priority data when no high-priority data is queued in a network switch).

In many applications, network switches connect communication nodes together in a computer network by using packet switching to receive, process, and forward data to the destination device (communication node). Network switches forward data only to one or multiple devices that need to receive it, rather than less advanced network hubs that broadcast the same data out of each of its ports.

In many applications, network switch and communication node implementations receive data packets with varying levels of importance. Typically, these devices allocate the use of raw bit streams over a physical medium (also referred to herein as a shared resource) based on a first-in-first-out methodology ("FIFO"). Embodiments of the present disclosure relate to a recognition that allocating data packets using a FIFO methodology does not address priority allocation of data packets within the same queue, which can be particularly relevant for data packets that have a high priority of allocation (e.g., control-data traffic to vital systems of the vehicle). Some data, such as control-data traffic for vehicles, can be sensitive to even small latencies induced by network switch service times. Priority allocation application that use complex protocols and complex circuitry (e.g., additional communications circuits/ports) can be susceptible to failure and additional cost. These and other issues continue to present challenges to the implementation of network switches in a variety of applications, and in particular to addressing data packet prioritization in a network switch (and communication nodes), such as for control data traffic in a vehicle. Aspects of the present disclosure, which may be implemented in a wide-variety of applications (including vehicles, planes, general computing systems, etc.) benefit from a two-stage prioritization scheme for data packets waiting for a shared resource. Such a two-stage prioritization scheme allows for a high-level of granularity when prioritizing the order in which data packets are to be processed by the shared resource.

Various example embodiments are directed to circuits, networks, systems and approaches that address challenges including those discussed above, including embodiments directed to network switch circuits and their implementation.

According to an example embodiment, a switch apparatus is disclosed including a memory circuit, switch fabric, queue control and sort circuitry, and queue selection circuitry. In one such embodiment, the memory circuit receives and stores data packets (in a plurality of queues) in preparation for transmitting the data packets over a shared resource to one of a plurality of communication nodes (within a local Ethernet-based communication network). The data packets include a media access control address ("MAC address") indicative of an intended destination of each of the received data packets and a data packet traffic class. The queue control and sort circuitry assigns each of the received data packets in to one of the plurality of queues based upon the data packet traffic class of each data packet. In various embodiments, the data packets in at least one of the queues is sorted by the queue control and sort circuitry based upon the MAC address of each data packet. The queue selection circuitry then selects a queue of the plurality of queues to be serviced and the data packet at the top of the selected queue is transmitted via the physical layer to the intended final/intermediate destination (e.g., a communication node).

Some other embodiments of the present disclosure are directed to systems including network switches and a plurality of network communication nodes. The plurality of network communication nodes receive and transmit data packets between one another via at least one of the network switches. In many embodiments, each of the network switches includes memory circuit, switch fabric, queue control and sort circuitry, and queue selection circuitry. In one such embodiment, the memory circuit receives and stores data packets (in a plurality of queues) in preparation for transmitting the data packets over a shared resource to one of a plurality of communication nodes. The data packets include a MAC address indicative of an intended destination of each of the received data packets and a data packet traffic class. The queue control and sort circuitry assigns each of the received data packets in to one of the plurality of queues based upon the data packet traffic class of each data packet. In various embodiments, the data packets in at least one of the queues is sorted by the queue control and sort circuitry based upon the MAC address of each data packet. The queue selection circuitry then selects a queue of the plurality of queues to be serviced and the data packet at the top of the selected queue is transmitted over the physical layer to its intended communication node.

Many embodiments of the present disclosure are directed to methods, one method discloses receiving data packets from a plurality of communication nodes within a local Ethernet network, the data packets including a MAC address indicative of a destination and a data packet traffic class. Based upon the traffic class of each data packet, each of the received data packets is assigned in to one of the plurality of queues of a memory circuit. The data packets assigned to at least one of the queues are then sorted based upon the MAC address of each data packet in the queue. The data packets in each of the queues wait until they reach the top of the queue and the respective queue is selected to be serviced (for example, by a shared resource) and transmitted over the shared resource (e.g., a physical wire) to an intended destination.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
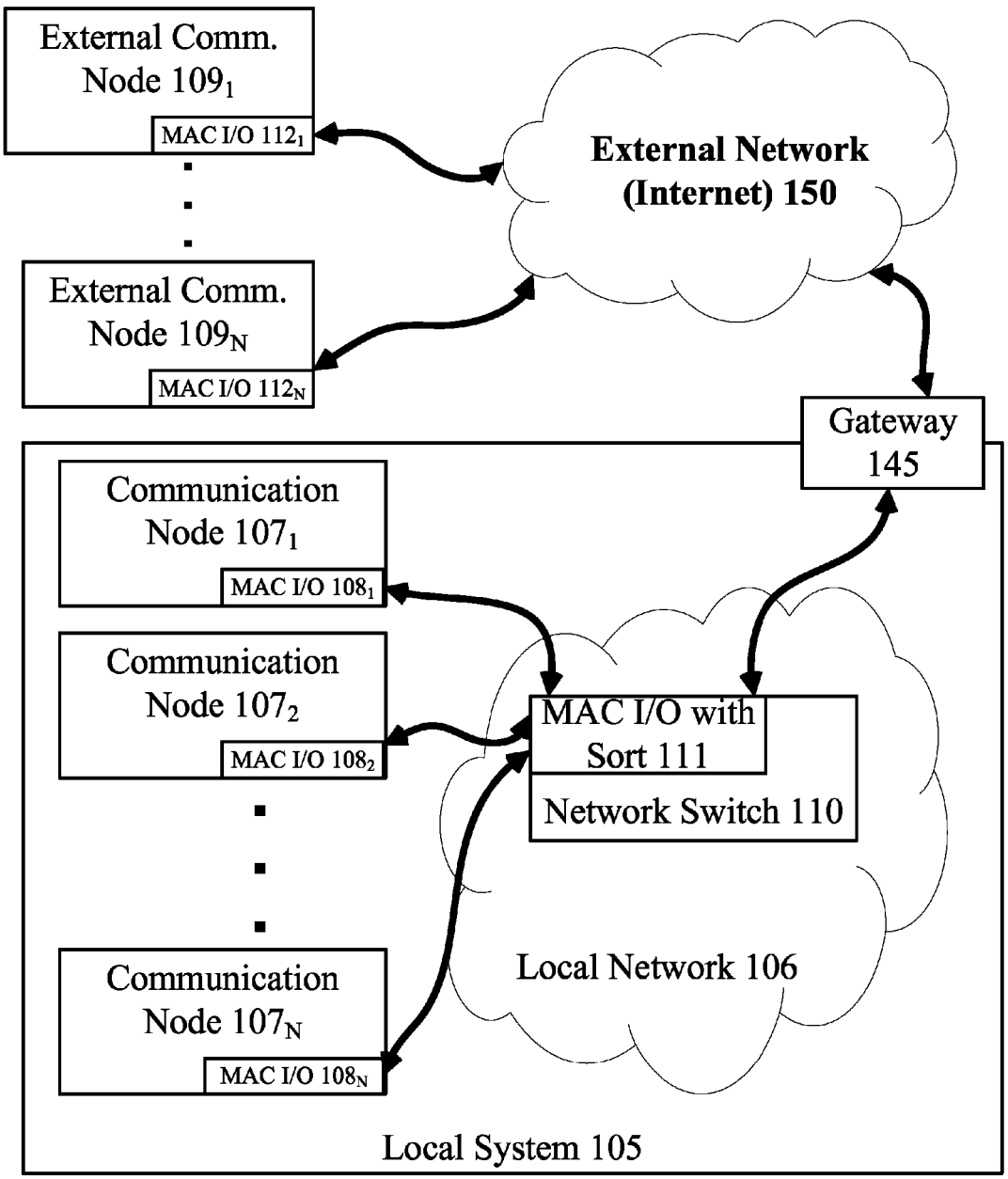
FIG. 1 shows a block diagram of an electrical communication network, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving queue control and sort circuitry that assigns data packets into one of a number of queues based upon a traffic class of the data packets, and further sorts the data packets assigned to each queue based upon each data packets MAC address. In certain implementations, aspects of the present disclosure have been shown to be beneficial when used in the context of a network switch where the network switch may process received data packets faster than it can transmit each of the data packets over a shared resource (e.g., Ethernet-based communication network). In such an embodiment, a memory circuit is required to queue the processed data packets until the shared resource is able to allocate resources to a particular received data packet. Such a communication network is being increasingly used in Ethernet-based vehicle communication systems. Aspects of the present disclosure have also been shown to be beneficial when used in the context of a MAC layer in an end-node hardware component that hosts multiple queues for frame forwarding prioritization before transmitting the data over the Physical (PHY) Layer. As discussed herein, the MAC layer and PHY layers are part of an Open Systems Interconnection (OSI) model. In particular, the MAC layer can be part of the Data Link Layer, and the PHY layer can be represent the layer in which transmission and reception of raw bit streams over a physical medium (also referred to herein as a shared resource).

In Ethernet-based vehicle communication systems, a number of communication nodes communicate data packets between one another via network switches which control the flow of the data packets between the source and destination communication nodes. To further improve the flow of data between communication nodes, the network can be implemented with a hierarchical arrangement to ensure priority delivery of control-data traffic to vital systems of the vehicle (e.g., brakes, air-bags, etc.) over non-critical time-wise data (e.g., audio/visual data, heating, ventilating and air-conditioning ("HVAC") control, etc.). Such aspects of the present disclosure prevent the need for duplicative networks otherwise required for control-data traffic in a vehicle, and/or the latency associated with such control-data traffic if queued with all other data traffic on a vehicle's communication network in a FIFO arrangement. While not necessarily so limited to network switches, various aspects of the present disclosure may be appreciated through a discussion of examples using such exemplary contexts—with the understanding that the present disclosure is readily applicable to components in a communication network which utilize MAC layers to prioritize frame forwarding.

In many applications, network switches receive, and forward data packets from a number of communicatively coupled communication nodes in the network with varying levels of importance. Such applications often require complex protocols and complex circuitry (e.g., additional communications circuits/ports), which can be susceptible to failure and additional cost. These and other issues continue to present challenges to the implementation of network switches in a variety of applications, and in particular to addressing data packet prioritization in a network switch, such as for control data traffic in a vehicle.

Aspects of the present disclosure, which may be implemented in a wide-variety of applications (including vehicles, planes, general computing systems, etc.) benefit from a two-stage prioritization scheme for data packets waiting for a shared resource. Such a two-stage prioritization scheme allows for a high-level of granularity when prioritizing the order in which data packets are to be processed by the shared resource. For example, in some embodiments of the present disclosure, a number of queues are established in a memory circuit of a network switch. Each of the queues are assigned to a particular Ethernet traffic class which is indicative of the data packets priority. Once assigned to a particular queue, the data packets in the queue are further sorted based on a MAC address associated with the data packet In particular embodiments, a network switch can be configured to sort packets within a queue from lowest to highest MAC address (or from highest to lowest MAC address). This can be particularly useful in a local (closed) network system, where MAC addresses may be locally administered to each of the communication nodes in the local system (and are not required to be universally unique like globally administered MAC addresses). For ease of discussion, various embodiments are discussed in connection with a network switch that is configured to sort form lowest MAC address to highest MAC address to provide higher priority routing to lower MAC addresses. It is understood, however, that other sorting solutions are possible including, but necessarily limited to, highest to lowest sorting. The local administration of MAC addresses allows the relevant communication nodes (e.g., the higher priority communication nodes) to be assigned MAC addresses based on the communication nodes relative level of importance. In one such implementation, communication nodes associated with critical functionality of the vehicle (e.g., brakes, airbags, etc.) are assigned lower MAC addresses and non-critical systems (e.g., audio/visual data, HVAC control, etc.). Accordingly, within each queue, the MAC addresses are sorted with the lowest MAC address at the top of the queue and the highest MAC address at the bottom of the queue. In various embodiments, queue selection circuitry then selects which queue to service based in part on the respective priority or each queue and also the number of data packets queued in each.

Various example embodiments are directed to circuits, networks, systems and approaches that address challenges including those discussed above, including embodiments directed to network switch circuits, communication nodes, and their implementation.

In accordance with various example embodiments, network switches are implemented in an Ethernet-based communication network with a number of communication nodes, the network switches facilitate selective addressing of each of the communication nodes. Each network switch can include a memory circuit, switch fabric, queue control and sort circuitry, and queue selection circuitry. In one such embodiment, the memory circuit receives and stores data packets (in a plurality of queues) prior to being transmitted to a communication node (within a local Ethernet-based communication network). The data packets include a MAC address indicative of an intended destination of each of the received data packets and a data packet traffic class. In certain experimental embodiments, the plurality of data-traffic classes includes control data traffic, entertainment-related traffic, and HVAC traffic. The queue control and sort circuitry assigns each of the received data packets in to one of the plurality of queues based upon the data packet traffic class of each data packet. In various embodiments, the data packets in at least one of the queues is sorted by the queue control and sort circuitry based upon the MAC address of each data packet. In yet further embodiments, the header of the data packet can include a Virtual Local Area Network Tag ("VLAN tag"), the data packets in at least one of the queues is sorted by the queue control and sort circuitry based upon the VLAN tag indicative of the data packets traffic class. The queue selection circuitry then selects a queue of the plurality of queues to be serviced and the data packet at the top of the selected queue is transmitted over a shared resource to its respective destination (e.g., communication node).

In some embodiments of a network communication component (e.g., network switch or end-node), in accordance with the present disclosure, the plurality of queues in the memory circuit includes a control data traffic queue. Queue control and sort circuitry assigns received data packets to the control data traffic queue based upon the traffic class of the received data packet being indicative of control data traffic. The queue control and sort circuitry then sorts the data packets assigned to the control data traffic queue based upon a destination MAC address associated with each data packet. In some detailed embodiments (where control data traffic is critical to an Ethernet-based communication network), the queue selection circuitry selects the control data traffic queue as the next queue to be serviced when data packets are stored in the control data traffic queue. When the control data traffic queue is empty, the other queues are serviced based upon a random, pseudo-random, or priority based scheme. In alternative embodiments, the queue selection circuitry select the next queue to be serviced based on a prioritization assigned to each of the plurality of queues.

According to some embodiments of the present disclosure, memory circuit, queue control and sort circuitry, and queue selection circuitry are associated with a first output port of the network switch. These circuits only service data packets received by the first output port, and the switch further includes additional memory circuits, queue control and sort circuitry, and queue selection circuitry associated with additional output ports. In such embodiments, priority of data packets out of the network switch can be controlled with a high-degree of granularity, minimizing the latency of control-data traffic through the entirety of the switch.

In certain experimental embodiments of the present disclosure, queue control and sort circuitry sorts the data packets within at least one of the queues based upon lower MAC address destinations, sources, or subsets of the destination and/or source MAC addresses taking priority in the queue over higher MAC address destinations, sources, or subsets of the destination and/or source MAC addresses. For ease of discussion, the MAC address prioritization and sorting is discussed relative to the full MAC address of the destination device. It is understood, however, that the prioritization and sorting can be carried out based, instead, upon the MAC address of a source of the packet, and whether source or destination, a subset of the MAC address. In embodiments, the MAC addresses assigned to critical communication nodes (e.g., crash prevention related communication nodes), in a vehicle's local Ethernet-based network for example, would be lower MAC addresses compared to communication nodes associated with HVAC, entertainment, and other data packets which are less sensitive to latency over the network.

Some other embodiments of the present disclosure are directed to systems including network switches and a plurality of network communication nodes. The plurality of network communication nodes receive and transmit data packets between one another via at least one of the network switches. In many embodiments, each of the network switches includes memory circuit, switch fabric, queue control and sort circuitry, and queue selection circuitry. In one such embodiment, the memory circuit receives and stores data packets from a plurality of communication nodes (within a local Ethernet-based communication network) in a plurality of queues. The data packets include a media access control address ("MAC address") indicative of an intended destination of each of the received data packets and a data packet traffic class. The queue control and sort circuitry assigns each of the received data packets in to one of the plurality of queues based upon the data packet traffic class of each data packet. In various embodiments, the data packets in at least one of the queues is sorted by the queue control and sort circuitry based upon the MAC address of each data packet. The queue selection circuitry then selects a queue of the plurality of queues to be serviced and the data packet at the top of the selected queue is transmitted via a share resource toward its respective destination indicated by the MAC address.

Embodiments of the present disclosure are directed to methods, one method discloses receiving data packets from a plurality of communication nodes within a local Ethernet network, the data packets including a media access control address ("MAC address") indicative of a destination and a data packet traffic class. After routing each of the received data packets to an appropriate output port, based upon the traffic class of each data packet, each of the received data packets is assigned in to one of the plurality of queues of a memory circuit. The data packets assigned to at least one of the queues are then sorted based upon the MAC address of each data packet in the queue. The data packets in each of the queues wait until they reach the top of the queue and the respective queue is selected to be serviced and transmitted over a shared resource (e.g., physical layer).

Various embodiments of the present disclosure are directed to MAC layers in hardware components of various other types of communication nodes (e.g., such as end-nodes that are on either end of communications passing through a network) within a communication network. The MAC layers in each such end-node hardware component hosts multiple queues for determining frame forwarding prioritization of the data packets within each of the multiple queues. Theses end-nodes (also referred to as network communication nodes) receive and transmit data packets between one another via network switches. In embodiments, each of the MAC layers of the end-nodes include a memory circuit, a shared resource, queue control and sort circuitry, and queue selection circuitry. In one such embodiment, the memory circuit receives and stores data packets in a plurality of queues prior to being transmitted over a physical layer to a network switch. The data packets include a MAC address indicative of an intended destination of each of the received data packets and a data packet traffic class. The queue control and sort circuitry assigns each of the received data packets in to one of the plurality of queues based upon the data packet traffic class of each data packet. In at least one of the queues, the data packets are sorted by the queue control and sort circuitry based upon the MAC address of each data packet. The queue selection circuitry then selects a queue of the plurality of queues to be serviced and the data packet at the top of the selected queue is transmitted over a physical layer to the network switch.

As used herein, the shared resource can represent a hardware resource used to transmit or process the data packets. In the context of an end-node, the shared resource could be access to the network physical layer (for a source node) or to an internal communication bus (for a destination node).

Turning now to the figures, various embodiments of the present disclosure are presented by way of the illustrations. FIG. 1 shows a block diagram of an electrical communication network, consistent with various aspects of the present disclosure. The network includes both a local system 105 and an external network (e.g., Internet) 150. The local system 105 and the external network 150 may be communicatively coupled to one another via a gateway 145 that functions as a transceiver of data packets into and out of the local system 105. A local network 106 services the local system 105 including communication nodes 107$_{1-N}$. Data packets from the communication nodes 107$_{1-N}$ are transmitted (via its respective MAC I/O 108$_{1-N}$) to at least one of the network switches 110 in the local network 106 to receive, process, and forward data packets to the destination communication node (e.g., 107$_2$). Similarly, external communication nodes 109$_{1-N}$ communicate data packets (via its respective MAC I/O 112$_{1-N}$) to one another and to the communication nodes 107$_{1-N}$ via the external network 150 which services the respective data packets and forwards the data packets to the destination communication node (e.g., 109$_N$).

As shown in FIG. 1, each of the communication nodes 107$_{1-N}$ are assigned a locally administered MAC address via its respective MAC I/O 108$_{1-N}$. Each assigned MAC address is indicative of the priority of the system supported by the communication node 107$_{1-N}$. In one such embodiment, for example, communication node 107$_1$ is associated with an anti-lock braking system of an automobile. Due to the importance of the data packets being communicated from communication node 107$_1$, the MAC I/O 108$_1$ assigns communication node 107$_1$ MAC address: 002359 (a relatively low MAC address). Similarly, impact sensor (e.g., accelerometer or force sensor) communication node 107$_2$ is vital to determine the appropriate time to deploy air-bags, tension safety harnesses, and other related safety features; accordingly its MAC I/O 108$_2$ assigns communication node 107$_2$ MAC address: 001963 (another relatively low MAC address). Communication node 107$_N$ is associated with an entertainment system of an automobile. As the entertainment system is not critical to the safety of the vehicle or other critical systems, MAC I/O 108$_N$ assigns communication node 107$_N$ is assigned MAC address: 029931 (a relatively high MAC address).

When communication nodes 107$_{1-N}$ transmit data packets the data packets are transferred through one or more network switches 110 throughout the local network 106 which forwards each of the data packets to an appropriate destination communication node associated with the data packet (e.g., one or more of the communication nodes 107$_{1-N}$). Often times in communication systems, such as Ethernet-based communication networks, a network switch 110 during high-traffic periods may not be able to transmit data packets as quickly as the data packets are received and processed by the shared resource. Accordingly, aspects of the present disclosure are directed to a network switch 110 equipped with a MAC I/O with Sort circuitry 111 that stores the data packets after they have been serviced by switch fabric until the MAC I/O with sort circuitry 111 can transmit the data packets to a final/intermediate destination.

As discussed above, to reduce costs associate with local communication systems 105 in a vehicle, it is preferred to have a single system as opposed to parallel systems for different classes of communication traffic. However, such a single communication system, such as an Ethernet-based communication system, must service both critical-data traffic and non-critical data. As the critical-data traffic is typically associated with time-sensitive information, latency of such data packets associated with queues in a network switch 110 are ideally minimized. Accordingly, the present invention presents a methodology to prioritize critical-data traffic in network switches 110 and to minimize latency associated therewith.

In one such embodiment, as shown in FIG. 1, data packets received by the network switch 110 are stored, after being serviced by a shared resource, in a memory circuit (or queue). Before transmitting each of the data packets, MAC I/O with Sort circuitry 111 reads a MAC address associated with each of the data packets in the queue and sorts the queue order based on the MAC addresses. In various embodiments, the MAC I/O with Sort circuitry 111 may sort the data packets in the queue based on a MAC address associated with the sending communication node 107$_{1-N}$ and/or an intended recipient communication node 107$_{1-N}$ (a destination address). The network switch then services the data packets based upon the queue order provided by the MAC I/O with Sort circuitry 111.

In certain embodiments, each respective MAC I/O 108$_{1-N}$ of the communication nodes 107$_{1-N}$ prioritizes data packet using queue sorting (as discussed above). Specifically, each of the communication nodes 107$_{1-N}$ (or end-nodes) can be configured to store data packets in a plurality of queues (prior to transmitting the data packets in the local network 106). In such an embodiment, at least one of the queues is sorted based upon a source or destination MAC addresses of the data packets in the respective queue.

Figure 2:
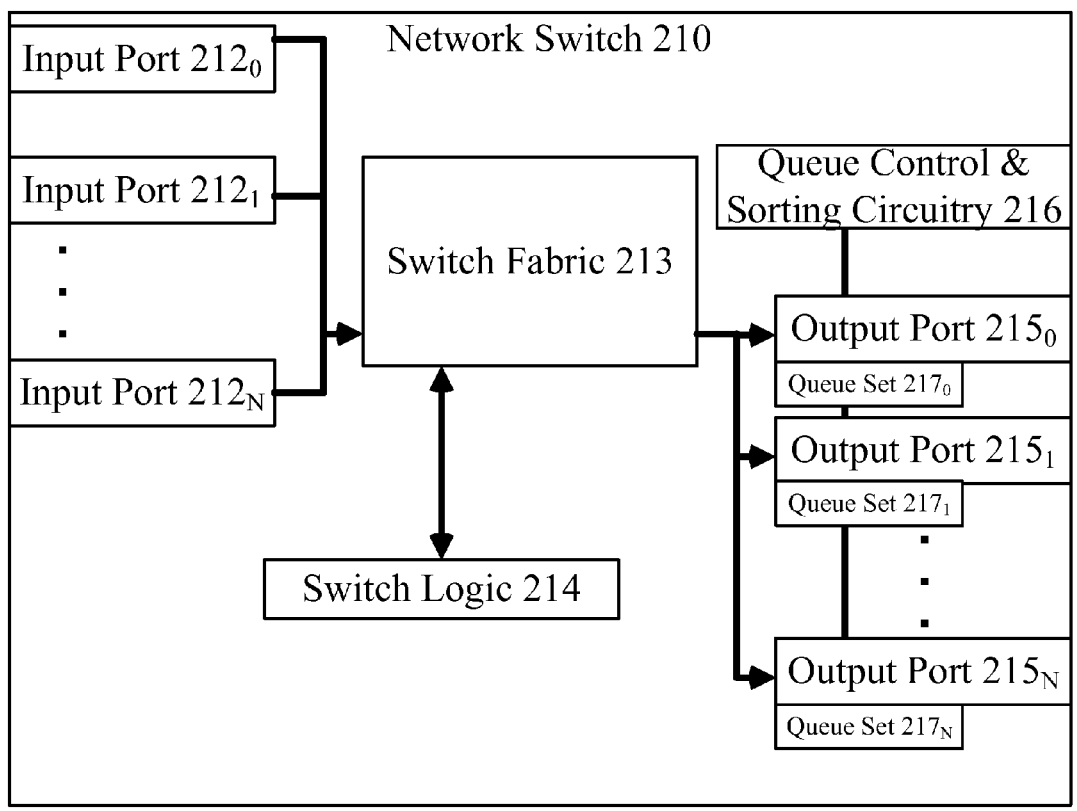
FIG. 2 shows a block diagram of a network switch, consistent with various aspects of the present disclosure.

FIG. 2 shows a block diagram of a network switch 210, consistent with various aspects of the present disclosure. It is to be understood that the block diagram of FIG. 2 is also readily applicable to other components in a communication network which utilize MAC layers to prioritize frame forwarding, such as communication nodes (e.g., end-nodes).

In many network switches, the switch 210 directly links to a number of communication nodes via input ports 212$_{1-N}$ and output ports $215_{1-N}$, accordingly the network switch 210 may forward data packets from a sending communication node to a destination node without also communicating the data packets to communication nodes that would otherwise have to receive the message and expend processing power only to determine that the received data packet is not intended for the communication node and can be ignored.

In the embodiment of FIG. 2, each output port $215_{0-N}$ in the network switch 210 has a dedicated queue set $217_{0-N}$. In such an embodiment, queue control and sorting circuitry 216 is able to finely control the priority of data packets flowing out of switch fabric 213. Taking output port $215_0$, for example, output port $215_0$ receives data packets from one or more communication nodes communicatively coupled to the network switch 210 (e.g., via an Ethernet-based communication network). After being serviced by the switch fabric 213, the received data packets are stored in the dedicated queue set $217_0$ for the output port $215_0$. In some embodiments, the dedicated queue set $217_0$ for the output port $215_0$ may include a number of queues associated with specific data traffic. When the output port $215_0$ receives a data packet from the switch fabric 213, the queue control and sorting circuitry 216 first assigns the data packet to a queue in the queue set $217_0$ based upon information in the data packet indicative of a traffic class of the data. It is to be understood that in various embodiments, each of the input ports $212_{1-N}$ may have its own dedicated queue control and sorting circuitry 216. In some embodiments the traffic class of the data packet is determined based-upon a VLAN tag associated with the data packet. Each type of VLAN tag being assigned to one or more queues in the queue set $217_0$. Accordingly, each of the data packets received by any of the output ports $215_{0-N}$ in the network switch 210 are assigned to a queue within respective queue sets $217_{0-N}$ of the output ports $215_{0-N}$.

In various further embodiments of the present disclosure, after assigning the data packets received by the output port $215_0$ into one of the queues in the queue set $217_0$, the queue control and sorting circuitry 216 further sorts the data packets stored within each of the queues in the queue set $217_0$.

Based upon the availability of each output port $215_{0-N}$ to service queued data packets and forward them on to each data packets respective destination (via a physical layer or wire), the queue sets $217_{0-N}$ store the data packets and the queue control and sorting circuitry 216 determines the order in which each queue of the queue sets $217_{0-N}$ are serviced by the output ports $215_{0-N}$.

In some embodiments, the queue control and sorting circuitry 216 may be programmed to provide preferential selection to data packets in queues allocated for time-sensitive information. For example, control-data traffic (e.g., anti-lock brake control data) can be highly sensitive to latency in a communication network of a vehicle. Accordingly, the queue control and sorting circuitry 216 can be configured to, for example, service all data packets in a control-data traffic queue (within the queue set $217_{0-N}$) before servicing other lower priority queues within the queue set $217_{0-N}$. As another example, the queue control and sorting circuitry 216 can be configured to more frequently service data packets in a control-data traffic queue than other lower priority queues within the queue set $217_{0-N}$. Similarly, in even more specific embodiments of the present disclosure, the queue control and sorting circuitry 216 may more frequently service a queue set $217_1$ of output port $215_1$, for example, based upon the data-traffic class of communication nodes communicatively coupled to the output port $215_1$.

It is to be further understood that the network switch 210 could further include queue sets attached to each of the input ports $212_{1-N}$ to similarly prioritize the transmission of data packets into the switch fabric 213 of the network switch 210.

Figure 3A:
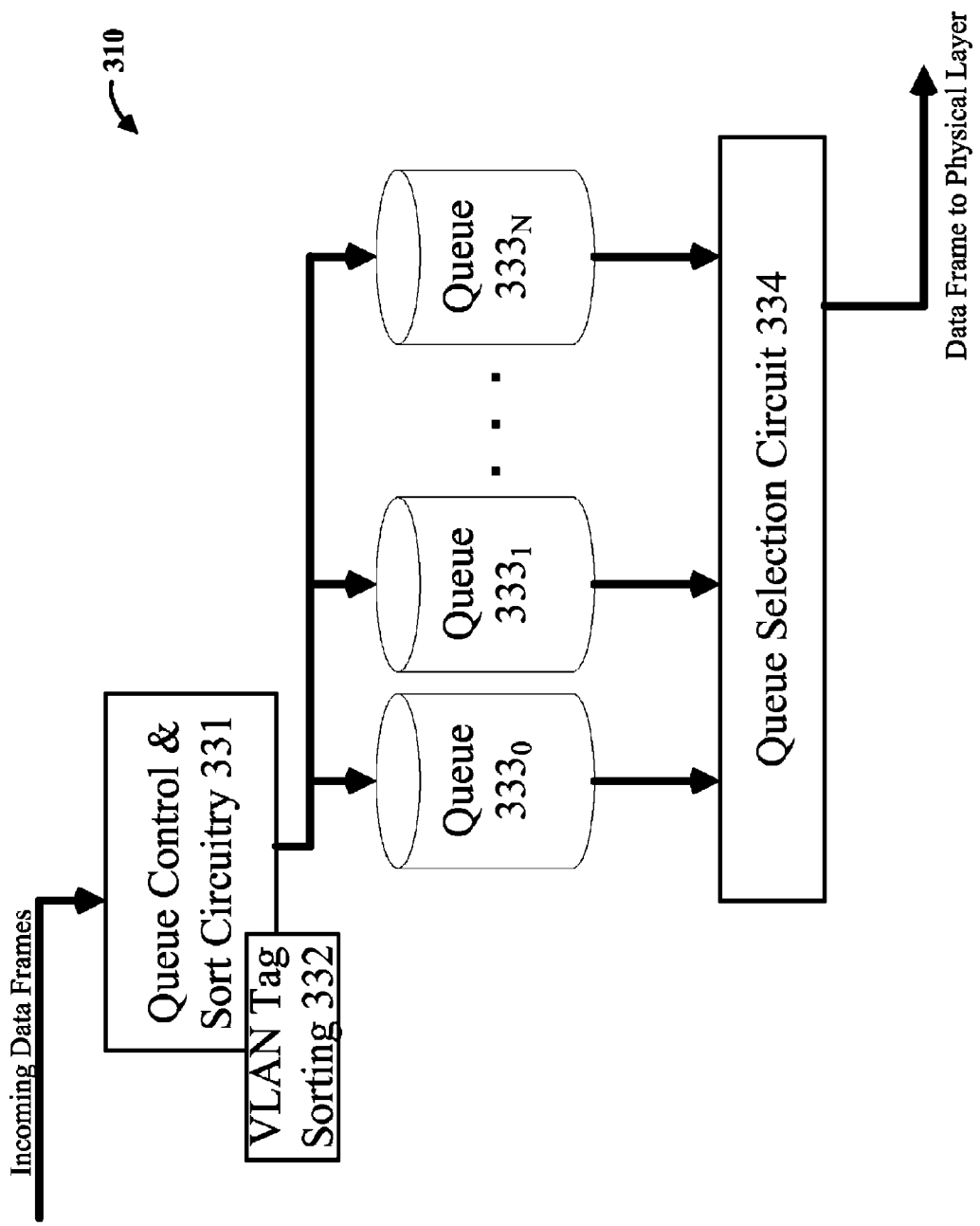
FIG. 3A shows a block diagram of a portion of a network switch, consistent with various aspects of the present disclosure.

FIG. 3A shows a block diagram of a MAC I/O 310, consistent with various aspects of the present disclosure. It is to be understood that such a MAC I/O 310 could be implemented in a MAC layer of an end-node, network switch, or other network communication component. In such an embodiment, incoming data frames (from a source such as an application, end-node, or switch fabric) are received by queue control and sort circuitry 331 (including in some embodiments integrated VLAN tag sorting circuitry 332). The queue control and sort circuitry 331 assigns each of the received data frames (or data packets) to one of the queues $333_{0-N}$ based upon the class of data traffic the data packet falls under. In one embodiment, the VLAN Tag sorting circuitry 332 analyzes the received data packets including a VLAN Tag indicative of the class of data traffic the data packets fall within. The queue control and sort circuitry 331 assigns each data packets to one of the queues $333_{0-N}$ based upon the VLAN Tag sorting circuitry 332 decision. As discussed in more detail in reference to FIG. 3B, queue control and sort circuitry 331 may further sort the data packets within one or more of the queues $333_{0-N}$ based upon other aspects of the data packet. The queue selection circuitry 334 then services each of the queues $333_{0-N}$ in a random, pseudo-random, or in a manner that further prioritizes control-data traffic by outputting the data frames to a physical layer.

Figure 3B:
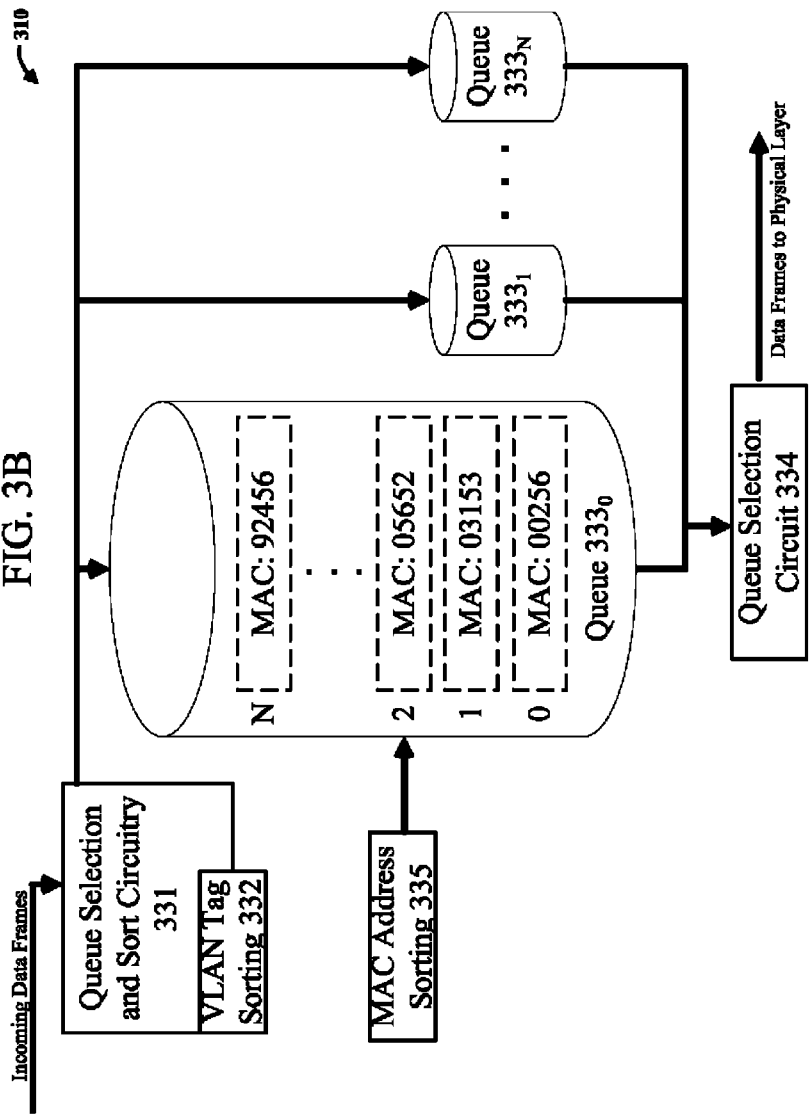
FIG. 3B shows a block diagram of a portion of a network switch, consistent with various aspects of the present disclosure.

FIG. 3B shows a block diagram of a portion of a network switch 310, consistent with various aspects of the present disclosure. In such an embodiment, incoming data frames are received by queue control and sort circuitry 331 including VLAN tag sorting circuitry 332. The queue control and sort circuitry 331 assigns each of the received data frames to one of the queues $333_{0-N}$ based upon the VLAN Tag sorting circuitry 332 processing the data packet to determine the class of data traffic the data packet falls under. In some embodiments, the received data packets include VLAN Tags indicative of the class of data traffic the data packets fall within, and based upon the VLAN Tag, the queue control and sort circuitry 331 assigns the data packets to one of queues $333_{0-N}$.

As shown in FIG. 3B, various applications may only necessitate that further sorting, within a queue, be conducted for higher priority queues such as control-data traffic queues (queue $333_0$). In the present embodiment, queues $333_{1-N}$ do not utilize further sorting within each queue as the data packets in the queue are, for example, related to audio/video traffic for the entertainment system, HVAC system controls, etc. In such an embodiment, after data packets are assigned to queue $333_0$, MAC address sorting circuitry 335 sorts the data packets in queue $333_0$ with the lowest MAC address at the top of the queue and the highest MAC address at the bottom of the queue. Specifically, MAC: 00256 is placed in queue position 0 as it is the lowest MAC address of the data packets currently residing in the queue $333_0$. Each subsequent queue position is assigned to the next lowest MAC address until reaching queue position N which is given to the highest MAC address of the data packets currently residing in the queue $333_0$. Accordingly, if no further data packets are assigned to queue $333_0$, MAC: 00256 will be the first data packet serviced from queue $333_0$ and MAC: 92456 will be serviced last. As discussed above, the queue selection circuit 334 selects which of the queues will be next serviced by the shared resource (e.g., physical layer)—this selection may be random, pseudo-random, or in a manner that further prioritizes control-data traffic or other priority data packets in a local network.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., queue control and sorting circuitry, switch logic, or queue selection circuit). For example, in certain of the above-discussed embodiments, one or more modules are discrete logic circuits or programmable logic circuits configured and arranged for implementing these operations/activities, as shown in FIG. 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, such a two-stage prioritization scheme, as disclosed herein, for sorting and prioritizing data packets to be processed by a shared resource could be utilized in a number of network communication systems and devices, and could be utilized outside an Ethernet communication-based network. Such modifications do not depart from the true spirit and scope of various aspects of the invention, including aspects set forth in the claims.

What is claimed is:

1. An apparatus comprising:
    shared resource circuitry configured and arranged to transmit data packets toward a destination of each data packet, each data packet including a media access control address ("MAC address") indicative of a data packet priority;
    queue control and sort circuitry configured and arranged to
        receive and store data packets in a plurality of queues based upon the priority of each data packet, wherein the plurality of queues includes a control data traffic queue, and
        sort the data packets within at least one of the plurality of queues based upon the MAC address of each data packet;
        assign the received data packets to the control data traffic queue based upon the traffic class of the received data packet being indicative of control data traffic and sort the data packets assigned to the control data traffic queue based upon the MAC address associated with each data packet, and wherein the MAC address included in each of the data packets is indicative of a destination of each respective data packet; and
    queue selection circuitry configured and arranged to select a queue of the plurality of queues to be serviced and transmit the data packets received from the selected queue to the shared resource circuitry.

2. The apparatus of claim 1, wherein the queue selection circuitry is further configured and arranged to select the control data traffic queue with a higher priority than other queues of the plurality of queues.

3. The apparatus of claim 1, wherein the queue selection circuitry is further configured and arranged to select the next queue to be serviced based on a prioritization assigned to each of the plurality of queues.

4. The apparatus of claim 1, wherein the MAC address is for a source node of the data packet.

5. The apparatus of claim 1, wherein the priority of each data packet in the plurality of queues is based on a traffic class in the MAC address.

6. The apparatus of claim 1, wherein the queue control and sort circuitry is further configured and arranged to sort the data packets within one of the queues based upon lower MAC addresses taking priority in the queue over higher MAC addresses.

7. The apparatus of claim 1, wherein the MAC address is indicative of a destination of the data packets associated therewith, and the priority of each data packet in the plurality of queues is based a Virtual Local Area Network Tag ("VLAN tag") that is indicative of a traffic class of the data packet.

8. The apparatus of claim 1, wherein the MAC address is for a destination node of the data packet.

9. A system comprising:
    a plurality of network communication nodes configured and arranged to receive and transmit data packets between one another via at least one network switch, the network switch including
        shared resource circuitry configured and arranged to transmit data packets toward a destination of each data packet, each data packet including a media access control address ("MAC address") indicative of a data packet priority;
        queue control and sort circuitry configured and arranged to
            receive and store data packets in a plurality of queues based upon the traffic class of each data packet, wherein the plurality of queues includes a control data traffic queue, and
            sort the data packets within at least one of the plurality of queues based upon the MAC address of the data packets within the at least one of the queues;
            assign the received data packets to the control data traffic queue based upon the traffic class of the received data packet being indicative of control data traffic and sort the data packets assigned to the control data traffic queue based upon a destination MAC address associated with the data packets assigned to the control packet queue; and
        queue selection circuitry configured and arranged to select a queue of the plurality of queues to be serviced and transmit the data packets received from the selected queue to the shared resource circuitry.

10. The system of claim 9, wherein the queue selection circuitry is further configured and arranged to select the control data traffic queue as the next queue to be serviced according to a higher priority relative to the other queues in the plurality of queues.

11. The system of claim 9, wherein the queue selection circuitry is further configured and arranged to select the next queue to be serviced based on a prioritization assigned to each of the plurality of queues.

12. The system of claim 9, wherein the queue control and sort circuitry, and the queue selection circuitry are associated with a first output port, and the network switch further includes additional queue control and sort circuitry, and queue selection circuitry associated with additional output ports.

13. A method comprising:
receiving data packets from a plurality of communication nodes within a local Ethernet network, the data packets including a media access control address ("MAC address") indicative of a destination and a data packet traffic class;
assigning, based upon the traffic class of each data packet, each of the received data packets in to one of a plurality of queues, wherein the assigning includes assigning the received data packets to a control data traffic queue based upon the traffic class of the received data packet being indicative of control data traffic;
sorting, based upon a corresponding MAC address, data packets within at least one of the queues wherein the sorting further includes sorting the data packets assigned to the control data traffic queue based upon a destination MAC address associated with each data packet;
transmitting, based upon an order of the data packets in the at least one of the queues, the data packets to a shared resource; and
routing and transmitting the data packets toward each data packets respective destination using the shared resource.

14. The method of claim 13, further comprising preferentially selecting the control data traffic queue as a next queue to be serviced relative to the plurality of other queues.

15. The method of claim 13, further comprising selecting a next queue to be serviced based on a prioritization assigned to each of the plurality of queues.

16. The method of claim 13, wherein the sorting further includes sorting the data packets within at least one of the queues includes ordering the packets from lower MAC address destinations to higher MAC address destinations.

17. The method of claim 13, wherein the assigning further includes assigning a data packet to one of the plurality of queues based on Virtual Local Area Network Tag ("VLAN tag") that is indicative of a traffic class of the data packet.

* * * * *